Fig. 2.
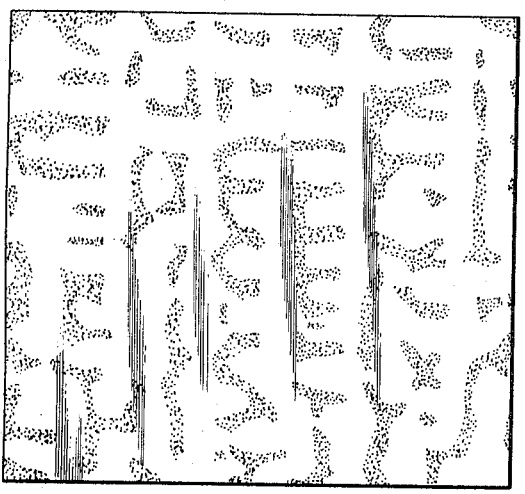
Fig. 3.
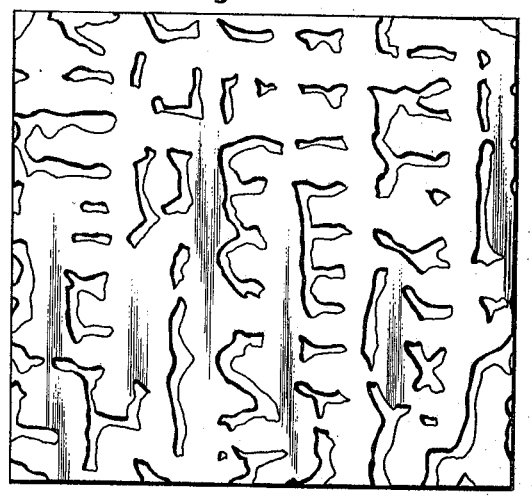
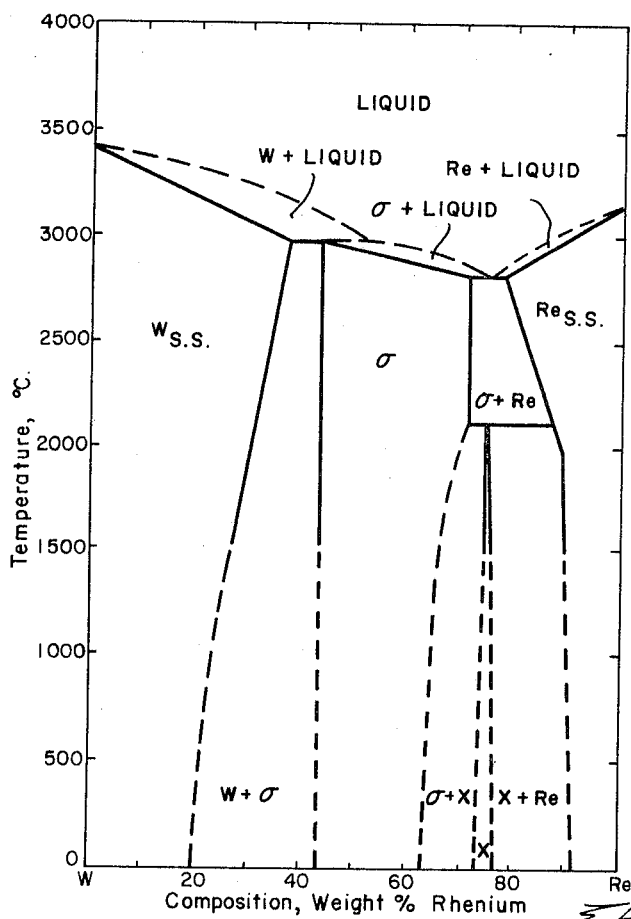
Fig. 1.
Milton E. Kirkpatrick,
INVENTOR.

United States Patent Office 3,364,018
Patented Jan. 16, 1968

3,364,018
POROUS TUNGSTEN RHENIUM ALLOY AND
METHOD OF MAKING SAME
Milton E. Kirkpatrick, Palos Verdes Estates, Calif.,
assignor to TRW Inc., a corporation of Ohio
Filed Oct. 17, 1963, Ser. No. 317,005
6 Claims. (Cl. 75—176)

This invention relates to a porous tungsten rhenium alloy and the method of making same, and more particularly to the preparation of porous metallic ion emitters for a contact type ion engine from tungsten rich two-phase tungsten rhenium alloys.

Porous metallic bodies have many different uses and various processes have been utilized for producing these porous metallic bodies. The preparation and production of refractory metal porous bodies for use as ionizers in contact type ion engines have proved particularly difficult, because of the severe conditions under which these porous bodies or emitters are normally operated. Porous tungsten emitters have been produced utilizing powder metallurgical techniques by sintering closely graded, small diameter particles into compacts which have densities between eighty and ninety percent of the theoretical fully dense tungsten. However, such emitters produced from powders suffer several disadvantages. First, it is extremely difficult even with closely graded and controlled powder sizes to produce large sections with uniform porosity. The interpore spacing is limited to a minimum of approximately six to eight microns by the sintering characteristics of extremely small diameter powder particles. Compacts prepared from powders having smaller diameters show poor dimensional stability at the critical operating temperature, thus causing a measurable decrease in porosity with time. In addition, porous tungsten bodies produced in this manner are both fragile and subject to contamination during fabrication.

Briefly stated, one preferred embodiment of the present invention consists essentially of a porous metallic body formed of tungsten rhenium alloy in the solid solution phase with a plurality of interconnected voids throughout the body formed by removal of uniformly dispersed particles of the sigma phase.

The process of the present invention basically consists of melting tungsten and rhenium to form a tungsten rich liquid solution and cooling the liquid down to form a body of the desired size and shape, and consisting of an alloy composed of the two phases, tungsten solid solution and sigma phase, having a microstructure of uniformly dispersed interconnecting particles of sigma phase in a tungsten solid solution matrix. This alloy is then rendered porous by preferentially etching the sigma phase from the matrix phase by a suitable etchant such as concentrated nitric acid.

One object of the present invention is to provide a porous metallic body having a uniform interconnecting porous structure with minimum pore diameter and pore spacing.

Another object of the present invention is to provide a porous metallic body having uniform porosity throughout relatively large sections of the body and providing long term dimensional stability at relatively high operating temperatures.

A further object of the present invention is to provide a porous metallic body which can be fabricated readily into optimum configurations for use as an ion emitter in a contact type ion engine, and which will have an emitting surface with high electronic work function and low thermal emissivity.

Still another object of the present invention is to provide a method of making a porous metallic body from a tungsten rich two-phase tungsten rhenium alloy.

Other objects and many of the attendant advantages of this invention will be readily appreciated as the same becomes better understood by reference to the following detailed description when considered in connection with the accompanying drawings wherein:

FIG. 1 is the equilibrium phase diagram for the tungsten rhenium alloy system;

FIG. 2 is a reproduction of a photomicrograph of a tungsten rhenium alloy with the dark stippled areas indicating the sigma phase alloy which is selectably etched away to form the porous metallic body, and the light areas are the tungsten solid solution matrix; and FIG. 3 is a view similar to FIG. 2 but showing the voids after removal of the sigma phase as shaded areas.

Referring now to the drawings in detail, FIG. 1 is an equilibrium phase diagram for the tungsten rhenium alloy system, and the present invention is particularly concerned with tungsten rhenium alloys ranging in composition from 25 to 43 weight percent (w./o.) rhenium which are composed of two distinct alloy phases, tungsten solid solution and the intermediate sigma phase ($\sigma$).

The desired mixture of tungsten and rhenium may be melted by any conventional techniques to form a liquid solution which is subsequently cooled to form a tungsten rhenium alloy consisting of a mixture of tungsten solid solution and the intermediate sigma phase, which exhibits a dendritic as-cast microstructure which is illustrated in FIG. 2.

Porous metallic bodies may be prepared on a laboratory scale by arc melting a mixture of tungsten and rhenium and casting the molten alloy. This material may then be used to fabricate thin wafer shaped specimens which are subsequently etched in concentrated nitric acid to preferentially remove the sigma phase from a tungsten solid solution matrix. The resulting alloy body will be porous and permeable, as shown in FIG. 3.

The relative proportions of each of the solid solution and sigma phases is determined not only by the basic alloy composition but also by the temperature at which phase equilibrium is achieved.

Furthermore, alloys having compositions between 25 and 37 weight percent of rhenium can be heat treated to produce a single phase tungsten solid solution alloy at elevated temperatures. This is due to the sloping solvus line as indicated in FIG. 1 which separates the tungsten solid solution field from the two phase field ($w+\sigma$). It is therefore possible after preparation and casting of alloys in this composition range to heat treat and homogenize the alloys at temperatures in excess of those for the solvus line. Cooling from these temperatures will cause uniform precipitation of sigma phase crystals or particles. For any given alloy composition, the particle size of this phase will be determined by the cooling rate from the elevated temperature solid solution field. Therefore, it is possible to produce a tungsten rich, tungsten rhenium alloy having a microstructure, which when rendered porous by selected etching and removal of the sigma phase from the tungsten solid solution matrix, will correspond to the desired predetermined permeability.

The method of the present invention has numerous advantages when compared to powder metallurgy techniques, particularly in the production of porous ion emitters. The starting materials need to be graded only on the basis of purity, since their original geometric shape has no effect on the final uniformity of the pore size and distribution in the porous metallic body. Furthermore, homogenous alloys can be prepared in a variety of shapes and sizes by conventional metallurgical melting and casting techniques, which are not possible with powder metallurgy techniques.

The choice of emitter fabrication techniques is also greatly increased by use of the present invention and can include such methods as forging, swaging and rolling, as well as conventional machining and grinding, since these processes can precede sigma phase precipitation and alloy treatment which renders the structure porous. Obviously, such processes would have a deleterious effect on porous bodies formed by sintering metallic particles.

Porous metallic ion emitters made in accordance with the present invention may have a pore size and distribution which can be precisely controlled through variations in the alloy composition and thermal treatment. Furthermore, the dimensional stability of the porous structure at elevated temperatures will be enhanced by the addition of rhenium, which results in the formation of a solid solution alloy matrix, since the recrystallization temperature is higher for the alloy than it is for the pure tungsten metal. The electronic work function of an ion emitter made in accordance with the present invention will probably be increased over that of pure tungsten through the addition of rhenium.

Obviously, many other modifications and variations of the present invention may be made within the scope of the following claims.

What is claimed is:

1. A porous metallic body comprising a matrix of a tungsten-rhenium alloy in the solid solution phase with a plurality of interconnected voids throughout the body.

2. A porous metallic body comprising a matrix of a solid solution consisting essentially of 25–43% by weight rhenium and 75–57% by weight tungsten having a plurality of interconnected voids throughout the body.

3. A porous metallic body comprising a matrix of a solid solution consisting essentially of 25–37% by weight rhenium and 75–63% by weight tungsten having a plurality of interconnected voids throughout the body.

4. A porous metallic body comprising a matrix of a solid solution consisting essentially of 25–37% by weight rhenium and 75–63% by weight tungsten having a plurality of interconnected sigma phase dendrite shaped voids throughout the body.

5. The method of making a porous metallic body comprising the following steps:
   (A) melting a mixture of tungsten and rhenium consisting of between 25 and 37 weight percent rhenium to form a liquid solution;
   (B) cooling said liquid solution to form a body comprising a two phase tungsten rhenium alloy including the tungsten solid solution and sigma phases;
   (C) reheating said body to a temperature above the solvus line;
   (D) cooling said body at a predetermined rate; and
   (E) selectively removing the sigma phase to form a porous body comprising a matrix of tungsten-rhenium solid solution with a plurality of uniformly dispersed and interconnected voids.

6. The method of making a porous metallic body comprising the following steps:
   (A) melting a mixture of tungsten and rhenium consisting of between 25 and 37 weight percent rhenium to form a liquid solution;
   (B) cooling said liquid solution to form a body comprising a two phase tungsten rhenium alloy including the tungsten solid solution and sigma phases;
   (C) reheating said body to a temperature above the solvus line;
   (D) cooling said body at a rate adapted to cause uniform precipitation of the sigma phase particles having the desired size and distribution in the alloy; and
   (E) selectively removing the sigma phase to form a porous body comprising a matrix of tungsten-rhenium solid solution with a plurality of uniformly dispersed and interconnected voids, thus providing a predetermined permeability.

References Cited

UNITED STATES PATENTS

| | | | |
|---|---|---|---|
| 2,866,727 | 12/1958 | Keegan | 148—4 |
| 2,895,819 | 7/1959 | Fiedler | 75—135 |
| 3,190,749 | 6/1964 | Fleming | 75—176 |
| 3,236,706 | 2/1966 | Kuchek | 156—2 |

OTHER REFERENCES

Dickinson et al.; Transactions of American Society for Metals, vol. 51, 1959, pp. 758–771 relied upon.

DAVID L. RECK, *Primary Examiner.*

RICHARD O. DEAN, *Examiner.*